United States Patent [19]
Ho et al.

[11] Patent Number: 5,587,899
[45] Date of Patent: Dec. 24, 1996

[54] METHOD AND APPARATUS FOR DETERMINING THE ULTIMATE GAIN AND ULTIMATE PERIOD OF A CONTROLLED PROCESS

[75] Inventors: Weng K. Ho; Chang C. Hang, both of Singapore, Singapore; Wilhelm K. Wojsznis, Round Rock, Tex.

[73] Assignee: Fisher-Rosemount Systems, Inc., Austin, Tex.

[21] Appl. No.: 258,282

[22] Filed: Jun. 10, 1994

[51] Int. Cl.$^6$ ................................. G05B 13/02
[52] U.S. Cl. ............................. 364/157; 364/162
[58] Field of Search .................... 364/148–151, 364/157–163, 180–182, 553; 318/561, 609, 610

[56] References Cited

U.S. PATENT DOCUMENTS

| | | | |
|---|---|---|---|
| 4,549,123 | 10/1985 | Hägglund et al. | 318/610 |
| 4,602,326 | 7/1986 | Kraus | 364/158 |
| 4,768,143 | 8/1988 | Lane et al. | 364/157 |
| 4,855,674 | 8/1989 | Murate et al. | 364/162 |
| 4,882,526 | 11/1989 | Iino et al. | 318/561 |
| 5,159,547 | 10/1992 | Chand | 364/157 |
| 5,229,699 | 7/1993 | Chu et al. | 318/610 |
| 5,283,729 | 2/1994 | Lloyd | 364/157 |

OTHER PUBLICATIONS

Dorf, "Modern Control Systems", Addison–Wesley, 1981, pp. 271–273.

Balchen, Jens G., et al., *An Adaptive Controller Based Upon Continuous Estimation Of The Closed Loop Frequency Response*, 1986, pp. 31–42.

Hägglund, Tore, et al., *Industrial Adaptive Controllers Based On Frequency Response Techniques*, Automatica, vol. 27, No. 4, 1991, pp. 599–609.

Kraus, T. W., et al., *Self–Tuning PID Controller Uses Pattern Recognition Approach*, Control Engineering, Jun. 1994, pp. 106–107, 110–111.

*Primary Examiner*—Tan V. Mai
*Assistant Examiner*—Steven R. Garland
*Attorney, Agent, or Firm*—Kinney & Lange

[57] ABSTRACT

A method and apparatus determine the ultimate frequency and ultimate gain of a controlled process. The apparatus comprises a process gain and phase lag calculation module, a ultimate gain ($K_U$) and ultimate period ($T_U$) calculation module, and a tuning sequence control module. The tuning sequence control module initiates a tuning sequence and the process gain and phase lag calculation module samples the process input signal and the process output signal, and isolates from the process input signal and the process output signal at least one input sample signal and at least one corresponding output sample signal by bandpass filtering the process input signal and the process output signal at at least one observation frequency. The process gain and phase lag calculation module then calculates a phase lag of each output sample signal with respect to a corresponding input sample signal and a signal gain of each output sample signal with respect to a corresponding input sample signal. The ultimate period of the process is calculated from at least one observation frequency and at least one phase lag, and the ultimate gain is calculated based on at least one signal gain.

59 Claims, 8 Drawing Sheets

5,587,899

METHOD AND APPARATUS FOR DETERMINING THE ULTIMATE GAIN AND ULTIMATE PERIOD OF A CONTROLLED PROCESS

BACKGROUND OF THE INVENTION

The present invention relates to adaptive process controllers. In particular, the present invention relates to a method and apparatus for automatically determining the ultimate gain and ultimate period of a controlled process, without significantly affecting the quality of process control.

Proportional, integral, and derivative (PID) controllers are widely used to control industrial processes. As used herein, the term PID controller encompasses all variations and combinations of the control functions of a PID controller, including P, PI, PD, and PID configurations. Such controllers are comprised of a proportional amplification unit with a proportional gain parameter $K_C$, an integration unit with an integration time parameter $T_I$, and a derivative unit with a derivative time parameter $T_D$. All controller parameters must be tuned for the controller to operate effectively.

Several manual methods of tuning a PID controller, such as the Ziegler-Nichols method, are known in the prior art. To tune a PID controller according to the Ziegler-Nichols method, the integration and derivative units are disabled and an operator manually increases the proportional gain of the amplification unit until the system begins to oscillate. The proportional gain that causes the system to begin to oscillate is the ultimate gain and the reciprocal of the frequency of the process output signal y measured at this proportional gain is the ultimate period. Accordingly, the ultimate period ($T_U$) is the period at which a process exhibits a phase lag of $-180°$. The ultimate gain ($K_U$) is the reciprocal of the process gain A of the process at the ultimate period. The ultimate frequency ($\omega_U$), is related to the ultimate period by the equation:

$$T_U = 2\pi/\omega_U$$

The parameters of the PID controller are calculated from the ultimate gain and the ultimate period by applying Ziegler-Nichols rules. For example:

$K_C = 0.6 K_U$, $T_I = 0.5 T_U$, and $T_D = 0.125 T_U$.

While manual tuning of PID controllers is possible, it is often tedious and inaccurate, especially when characteristics of the controlled process change over time. In addition, process non-linearities, such as dead zone time and hysteresis, may make it difficult to bring the system into controlled oscillation.

Hägglund et al. disclosed a method of tuning a PID controller in U.S. Pat. No. 4,549,123, which is incorporated by reference. The method was an improvement over the Ziegler-Nichols method and allowed the tuning procedure to be performed automatically.

In the method disclosed by Hägglund et al., a non-linear circuit is provided in the controller feedback path in place of the PID controller. The circuit oscillates between amplitudes +d and −d based on changes in the process output signal y, thereby ensuring system oscillation.

The ultimate period $T_U$ is equal to the period of oscillation of the process output signal y, and the ultimate gain $K_U$ is calculated in accordance with the equation:

$$K_U = \frac{4d}{\pi A_T},$$

where d represents the amplitude of the output of the non-linear circuit and $A_T$ represents the amplitude of the process output signal y. Once the ultimate gain and period are determined, the PID controller parameters are calculated as discussed above. This method is known generally in the art as relay auto tuning.

Since the method disclosed by Hägglund et al. causes the system to quickly and consistently enter oscillation, and the controller parameters are easily calculated from measuring the period and amplitude of oscillation, the method may be performed automatically by the controller. However, the method can interfere with the normal operation of the controller. Therefore, as suggested by Hägglund et al., the method should only be executed occasionally.

More recently, progress has been made in defining optimal PID controller settings. For example, internal model control-based tuning rules (IMC) have been instituted and have gained recognition. However, in order to apply the IMC rules, a mathematical model of the process under control is required. Unfortunately, the Ziegler-Nichols method and the auto relay tuning method do not assume a specific process model and do not provide sufficient data to generate such a mathematical model.

This problem is addressed in U.S. Pat. No. 4,768,143 to Lane et al., which discloses an adaptive gain scheduling algorithm that uses a parameter estimation module that implements a recursive least squares algorithm. This patent is incorporated herein by reference. The process model disclosed in this patent is simplified to the first order without accounting for time delay and only provides for controller gain correction.

Significant improvement to this approach is disclosed in U.S. Pat. No. 4,882,526 to Iino et al., which is incorporated herein by reference. This patent discloses a time domain process model that is identified by using the auto-regressive moving average model (ARMA) and least squares method. From the time domain process model, the frequency characteristics of the process are obtained through model transformation. Controller parameters are then calculated to get a desired response based on the identified model. The disadvantages of this method are that it requires complex computation to get a time domain model and then transform this model to a frequency domain model, that it is unable to cope with changing process time delay, and that there is a need to inject a disturbance into the process to perform identification and tuning. The tuning process has to be initiated by the user.

In a paper by Balchen and Lie entitled *An Adaptive Controller Based Upon Continuous Estimation Of The Closed Loop Frequency Response*, Modeling, Identification and Control, Volume 8, No. 4, pages 223–240 (1987), direct computation in the frequency domain is used to cause an injected test frequency to converge on the ultimate frequency. An excitation signal derived from a sine wave signal at the test frequency is injected into the system set point signal, and the process control signal is applied to a frequency multiplier along with a mixing signal that is derived from a cosine wave signal having the same test frequency. The frequency multiplier produces a multiplier output signal, and the test frequency is slowly adjusted based on the multiplier output signal using a trial and error method until the test frequency is approximately equal to the ultimate frequency. The system is simple, however it does require that the excitation signal be injected into the set point signal, and convergence of the test signal is relatively slow.

Another method of self-tuning a process controller was disclosed in U.S. Pat. No. 4,855,674 to Murate et al. This method adjusts the controller parameters by observing oscillations in the process output signal. However, this method is only appropriate for underdamped processes. It is not appropriate for overdamped or critically damped processes that do not develop oscillations.

SUMMARY OF THE INVENTION

The present invention is a method and apparatus for determining the ultimate period and ultimate gain of a controlled process having a process input for receiving a control signal that controls a parameter of the process and a process output for providing a process output signal representative of the parameter. The process is controlled by a controller. The controller has a controller output for providing the control signal and a controller input that receives an error signal derived from the process output signal, thereby forming a control loop.

The apparatus of the present invention comprises a process gain and phase lag calculation module, an ultimate gain ($K_U$) and ultimate period ($T_U$) calculation module, and a tuning sequence control module. The tuning sequence control module initiates and controls a tuning sequence, selects at least one observation frequency, determines controller parameters based on the ultimate gain and the ultimate period, and provides the controller parameters to the controller.

The process gain and phase lag calculation module is coupled to the tuning sequence controller, the control signal and the process output signal. A control sample signal corresponding to each observation frequency is isolated from the control signal by bandpass filtering the control signal at each observation frequency. Likewise, a process output sample signal corresponding to each observation frequency is isolated from the process output signal by bandpass filtering the process output signal at each observation frequency, with control sample signals and process output sample signals filtered at the same observation frequency forming corresponding pairs. Finally, for each corresponding pair, a phase lag and signal gain of the process are determined.

The ultimate gain ($K_U$) and ultimate period ($T_U$) calculation module calculates the ultimate period of the process from at least one observation frequency and at least one phase lag, and the ultimate gain of the process based on at least one signal gain.

In one form of the invention, a plurality of observation frequencies are selected. A first corresponding pair must have a phase lag that is less than 180° and a second corresponding pair must have a phase lag that is greater than 180°. The ultimate period is then calculated by interpolation based on the observation frequencies corresponding to the first and second corresponding pairs and the phase lags of the first and second corresponding pairs. The ultimate gain is calculated by interpolation based on the observation frequencies corresponding to the first and second corresponding pairs and the signal gains of the first and second corresponding pairs.

In another form of the invention, a tracking observation frequency is selected. The ultimate gain ($K_U$) and ultimate period ($T_U$) calculation module determines whether the phase lag of the corresponding pair corresponding to the tracking observation frequency is greater than or less than 180°. If the phase lag is less than 180°, then the ultimate period is determined by adding a frequency increment to the tracking observation frequency. If the phase lag is greater than 180°, then the ultimate period is determined by subtracting a frequency increment from the tracking observation frequency. This process is repeated until the phase lag is within a predetermined quantity of 180°, at which point the tracking observation frequency has converged on the ultimate frequency, which also defines the ultimate period. The reciprocal of the signal gain measured at this tracking observation frequency is the ultimate gain.

Once the ultimate period and ultimate gain have been determined, the controller parameters are updated accordingly.

DETAILED DESCRIPTION OF THE PREFERRED EMBODIMENTS

Figure 1:
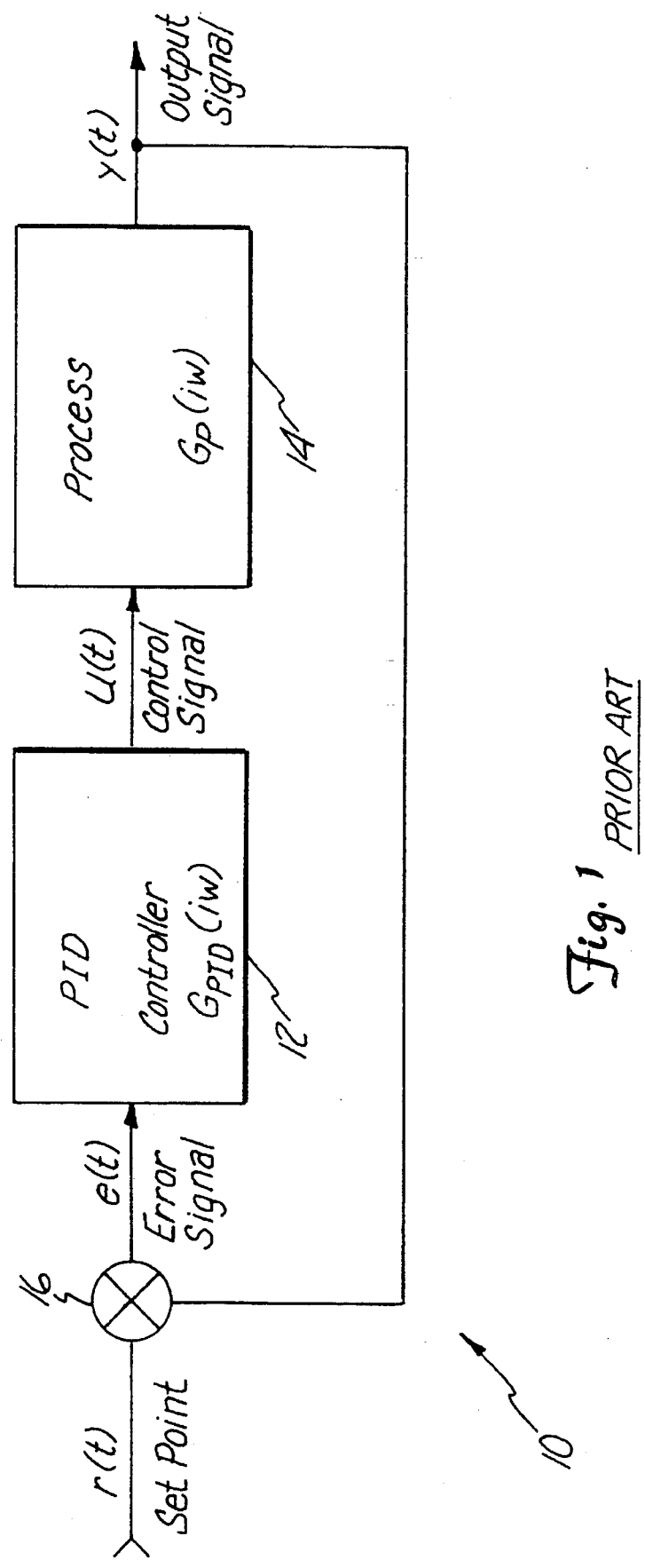
FIG. 1 is a block diagram of a prior art controlled process loop.

FIG. 1 is a block diagram of prior art controlled process loop 10. Loop 10 is comprised of proportional, integral, and derivative (PID) controller 12, process under control 14, and adder 16.

PID controller 12 receives an error signal e(t) from adder 16. PID controller 12 processes the error signal using control parameters to form the control signal u(t). The control parameters are known in the art as a proportional gain parameter $K_C$, an integration time parameter $T_I$, and a derivative time parameter $T_D$.

Process 14 receives the control signal u(t). In response to the control signal u(t), the process exhibits some type of response that is evident in the output signal y(t). The output signal y(t) is fed back to adder 16, where it is subtracted from the set point signal r(t) to produce the error signal e(t), which represents the difference between the desired process output and the current process output.

Control loop 10 may represent one of many different types of industrial processes. For example, assume process 14 comprises a mixing tank which must be maintained at a specified temperature. In this example, the output signal y(t) represents the measured temperature of the tank, the set point input r(t) represents the desired temperature of the tank, the error signal e(t) represents the difference between the set point temperature and the measured temperature and the control signal u(t) is used to control a heating element in the tank.

If the dynamics of a process remains relatively stable over time, then the process may only need to be tuned occasionally. In such a situation, a prior art tuning process, such as relay auto tuning, may be appropriate.

If the dynamics of a process changes predictably with respect to measurable variables, then gain scheduling may be appropriate. Gain scheduling (perhaps more accurately referred to as parameter scheduling) allows parameters of the PID controller to be selected based upon the value of the measurable variables.

Keeping the controller tuned becomes more difficult if the dynamics of the process changes unpredictably over time. For example, assume that the heating characteristics of a heating element change as the heating element ages, and that these changes are not easily measured. The controller can occasionally be tuned using relay auto tuning, but this requires that control of the process be interrupted. In addition, other elements of the processes may change more rapidly. Accordingly, it is desirable to have an adaptive controller which is capable of monitoring the controlled process and updating the PID parameters dynamically.

Hägglund and Åström disclosed an adaptive PID controller in a paper entitled *Industrial Adaptive Controllers Based on Frequency Response Techniques*, Automatica, Volume 27, No. 4, pp. 599–609 (1991), which is incorporated by reference. This paper discloses a PID controller which adaptively adjusts the proportional gain $K_C$ for the process under control.

Figure 2:
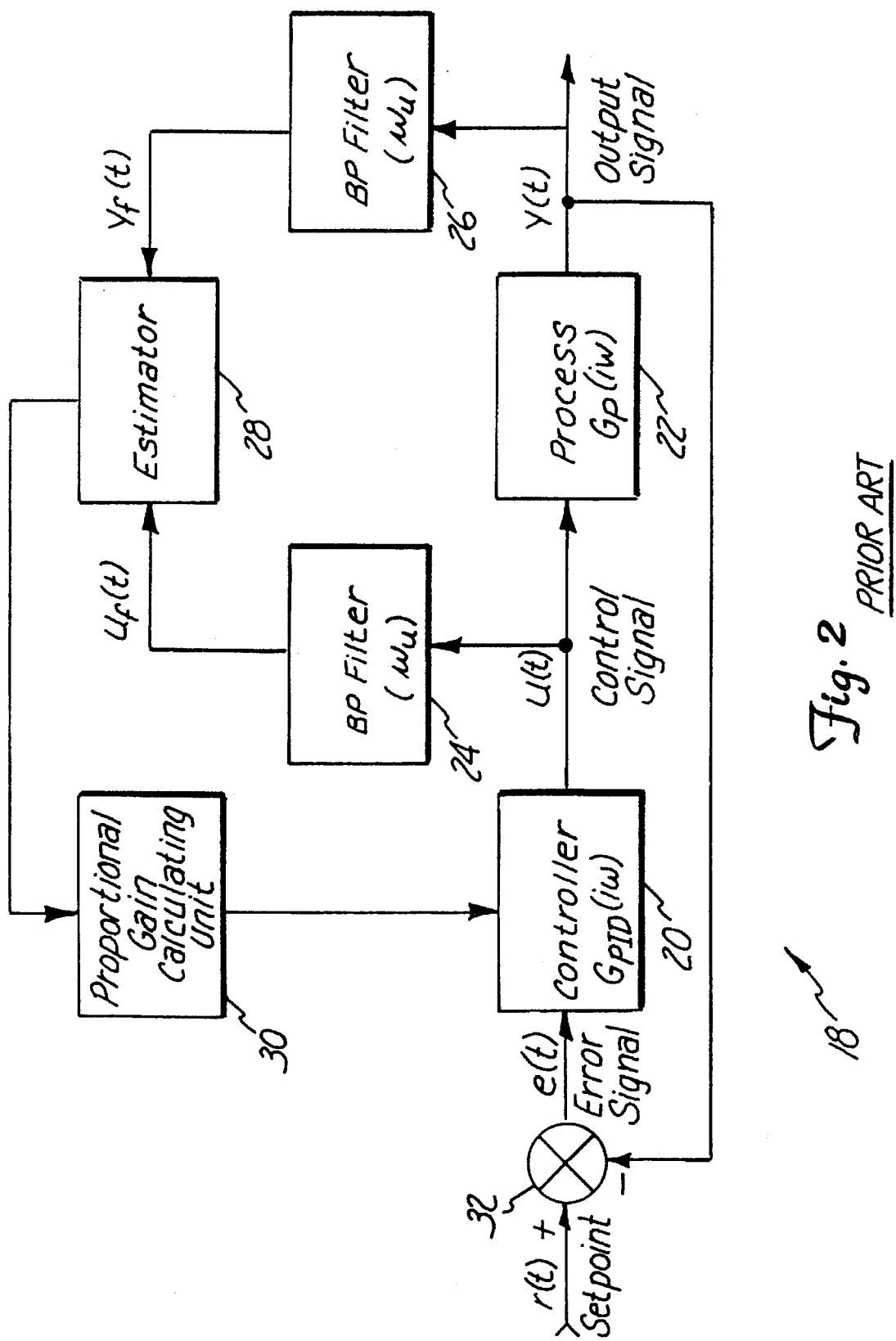
FIG. 2 shows a prior art controlled process loop and apparatus for updating the proportional gain of the controller, in accordance with the adaptive process controller disclosed by Hägglund and Åström.

FIG. 2 shows a controlled process loop 18 in accordance with the adaptive process controller disclosed by Hägglund and Åström. Controlled process loop 18 is comprised of controller 20, process under control 22, bandpass filters 24 and 26, parameter estimator 28, proportional gain calculation unit 30, and adder 32. Controller 20, process 22, and adder 32 function substantially as described in FIG. 1, and bandpass filters 24 and 26 have center frequencies of $\omega_U$, where $\omega_U$ is the ultimate frequency previously determined by relay auto tuning.

Bandpass filter 24 continuously samples and filters control signal u(t) and produces signal $u_f(t)$. Accordingly, signal $u_f(t)$ is approximately a sinusoidal signal having a frequency of $\omega_U$. Likewise, bandpass filter 26 continuously samples and filters process output signal y(t) and produces signal $y_f(t)$. Accordingly, signal $y_f(t)$ is also approximately a sinusoidal signal having a frequency of $\omega_U$, and the two signals are defined as follows:

$$u_f(t) = A_u \sin\omega_U t$$

and $$y_f(t) = A_y \sin(\omega_U t - \phi),$$

where $A_u$ is the amplitude of $u_f(t)$, $A_y$ is the amplitude of $y_f(t)$, and $\phi$ is the phase lag of $y_f(t)$ with respect to $u_f(t)$.

The signal gain A is defined as the ratio of $A_y$ to $A_u$. The values of A and $\phi$ are estimated by estimator 28. Estimator 28 provides A and $\phi$ to proportional gain calculation unit 30, which dynamically calculates the proportional gain $K_C$ of controller 20 from A and $\phi$.

Figure 3:
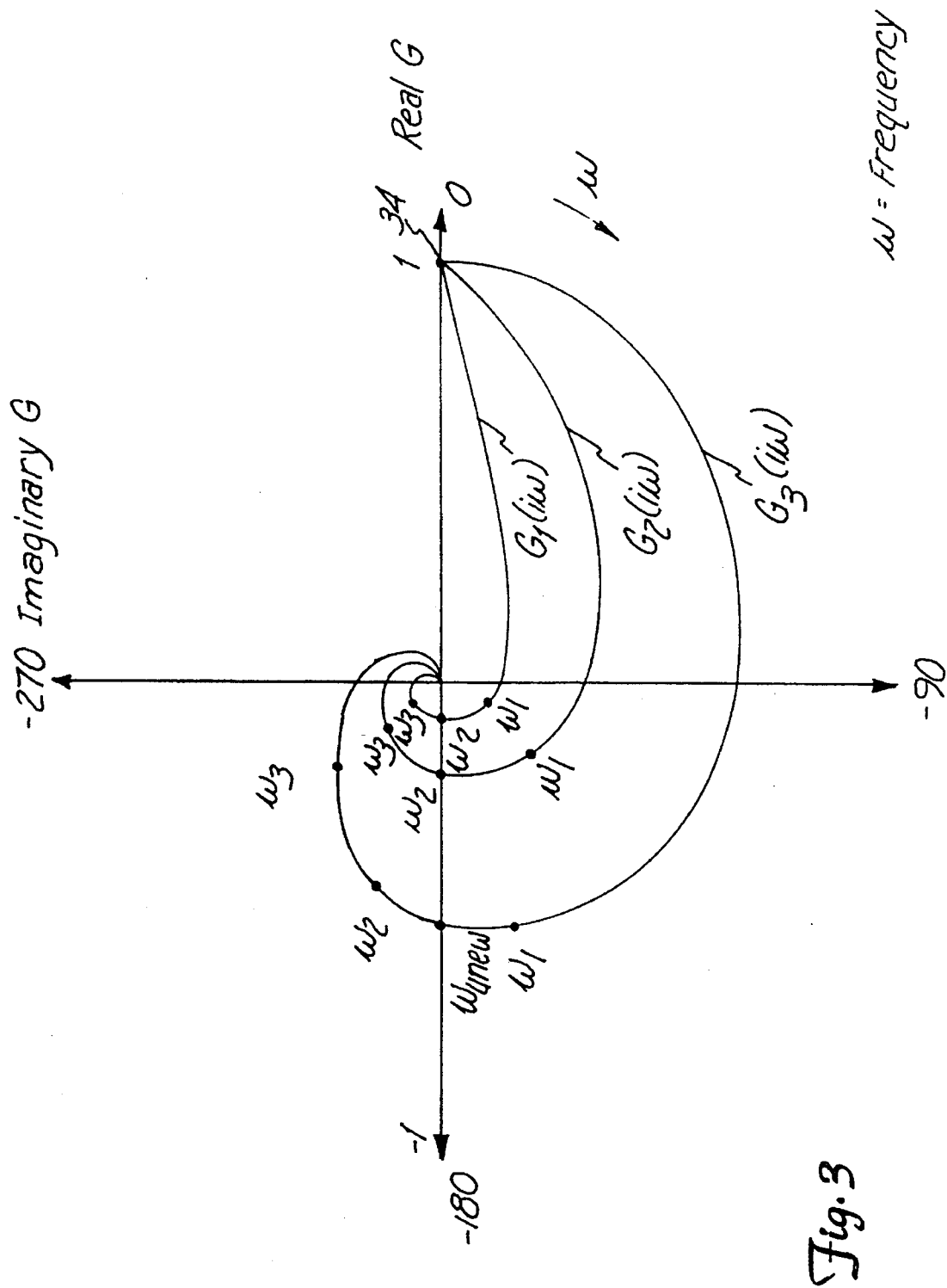
FIG. 3 is a Nyquist plot of three transfer functions.

The operation of estimator 28 can be explained by observing the transfer function $G_p(i\omega)$ of process 22 using a Nyquist plot. For example, FIG. 3 is a Nyquist plot of three transfer functions $G_1(i\omega)$, $G_2(i\omega)$, and $G_3(i\omega)$. In FIG. 3, each transfer function begins at point 34, where the frequency is zero and the gain is unity, and proceeds to the origin of the graph. The frequency of each transfer function increases as the curve of the transfer function proceeds in a clockwise direction.

On the curve of each transfer function are labeled the frequencies $\omega_1, \omega_2,$ and $\omega_3$. Each similarly referenced point represents the same frequency on each of the transfer functions.

Assume that relay auto tuning was performed on controlled process loop 18 in FIG. 2 when the transfer function $G_p(i\omega)$ of process 22 was equal to the transfer function $G_2(i\omega)$ in FIG. 3. Accordingly, the measured value of the ultimate gain $K_U$ would be the reciprocal of the process gain, which is defined as the distance from the origin to the frequency $\omega_2$ on function $G_2(i\omega)$.

As used herein, the term phase lag refers to the lag of an output signal with respect to an input signal and is a positive quantity expressed in degrees. Accordingly, a phase lag of 210° is greater than a phase lag of 170°. Those skilled in the art will recognize that such plots may be alternatively expressed in degrees or radians.

As long as the transfer function of process 22 remains equal to $G_2(i\omega)$, estimator 28 will continue to estimate the same value of A and will continue to estimate the phase lag $\phi$ to be approximately 180°. Therefore, proportional gain calculation unit 30 will continue to calculate the same ultimate gain $K_U$ by calculating the reciprocal of A.

Next, assume that the transfer function of process 22 has shifted such that $G_p(i\omega)$ is now equal to $G_1(i\omega)$ in FIG. 3. Since the new transfer function $G_1(i\omega)$ still crosses the −180° axis at a frequency of $\omega_2$, the phase lag will still be 180°. However, the value A calculated by estimator 28 will be lower since the transfer function $G_1(i\omega)$ crosses the −180° axis at a point closer to the origin. Based on the values provided by estimator 28, proportional gain calculation unit 30 must increase the proportional gain $K_C$ of controller 20 to compensate for the new transfer function. Accordingly, the system shown in FIG. 2 performs quite well when a change in the transfer function requires that only the proportional gain $K_C$ of PID controller 20 be adjusted.

However, this is not the case if the transfer function changes such that the phase lag $\phi$ changes significantly. Assume that the transfer function $G_p(i\omega)$ of process 22 has shifted such that it is now equal to $G_3(i\omega)$ in FIG. 3. With this transfer function, the values A and $\phi$ estimated by estimator 28 will increase. However, the ultimate gain can no longer be accurately calculated from A because A is no longer measured at a phase lag of 180°. Furthermore, in such a case the derivative time $T_D$ and the integration time $T_I$ of the controller must also be adjusted. However, the paper by Hägglund and Åström does not teach or suggest how a new ultimate period can be calculated. Therefore, neither the proportional gain parameter $K_C$, the derivative time $T_D$ nor the integration time $T_I$ of the controller can be updated.

Figure 4:
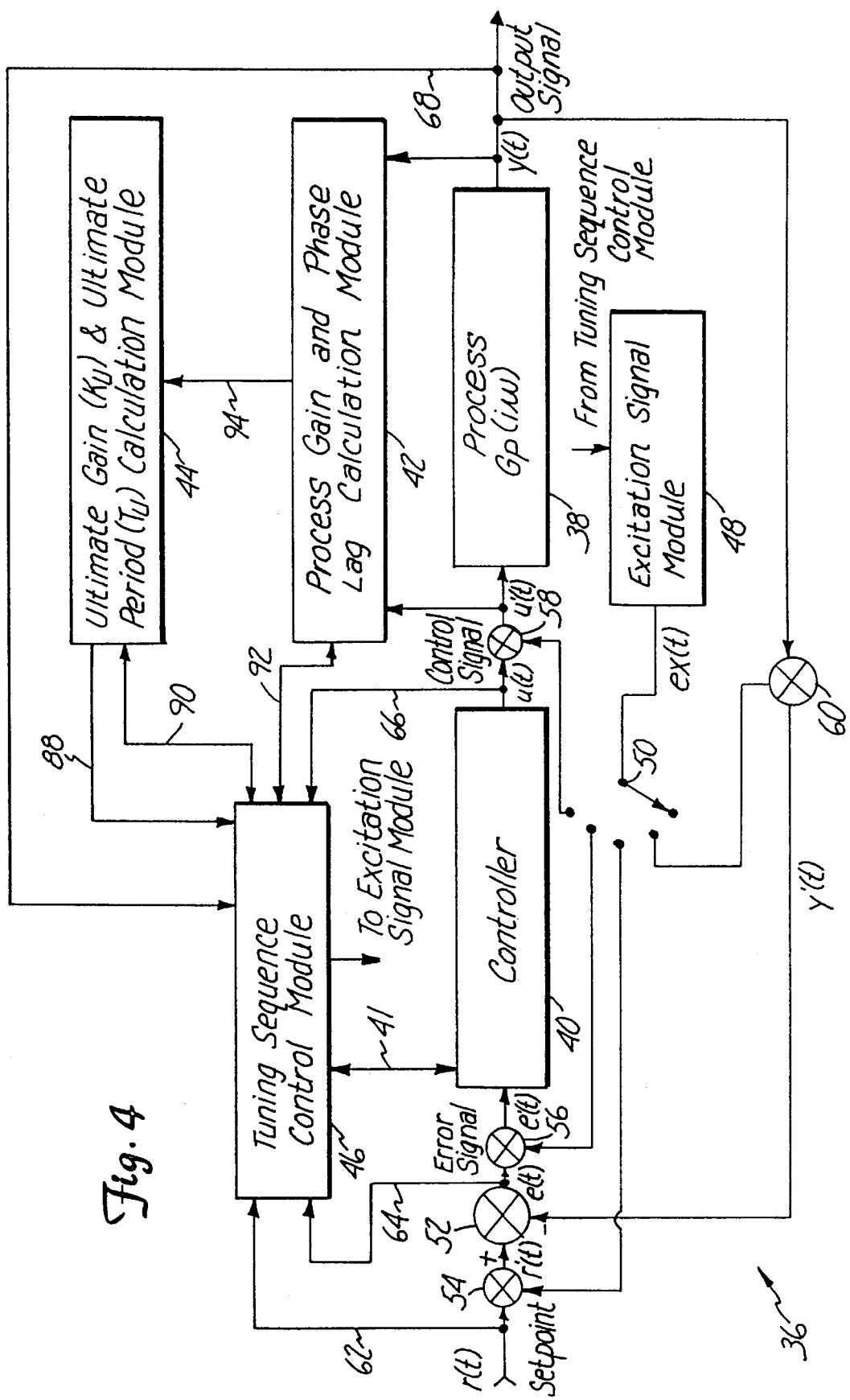
FIG. 4 is a block diagram showing a controlled process loop and the apparatus for determining the ultimate gain and ultimate period of the present invention.

FIG. 4 is a block diagram showing controlled process loop 36, which includes the apparatus for determining the ultimate gain and ultimate period of the present invention. Controlled process loop 36 is comprised of process under control 38, controller 40, process gain and phase lag calculation module 42, ultimate gain ($K_U$) and ultimate period ($T_U$) calculation module 44, tuning sequence control module 46, excitation signal module 48, switch 50, and signal adders 52, 54, 56, 58, and 60.

Process under control 38 receives control signal u'(t) from adder 58. Adder 58 forms control signal u'(t) by adding control signal u(t) from controller 40 to excitation signal ex(t) provided by excitation signal module 48. Excitation signal module 48 is provided to inject excitation frequencies into controlled process loop 36 and signal ex(t) can be selectively coupled to adders 54, 56, 58, and 60 by switch 50, which is controlled by tuning sequence control module 46. Alternatively, the signal ex(t) may also be disconnected from the adders, as shown in FIG. 4.

Process 38 has a transfer function $G_p(i\omega)$, which may vary unpredictably over time. In response to signal u'(t), process 38 produces a response that is represented at output signal y(t).

Output signal y'(t) (which is formed by adding excitation signal ex(t) to output signal y(t) at adder 60) is subtracted from set point signal r'(t) (which is formed by adding excitation signal ex(t) to set point signal r(t) at adder 54) by adder 52 to form error signal e(t). Error signal e(t) is added to excitation signal ex(t) at adder 56 to form error signal e'(t), which in turn is provided to controller 40, thereby completing the control loop.

The ultimate period $T_U$ and ultimate gain $K_U$ of process 38 are initially determined by relay auto tuning, as is known in the art. Tuning sequence control module 46 monitors the status of process 38 and the quality of process control achieved by controller 40 by monitoring various combinations of the signals r(t), e(t), u(t), and y(t), which are provided to module 46 via lines 62, 64, 66, and 68, respectively. As will be discussed below, module 42 includes buffers which store samples of the signals u'(t) and y(t). Accordingly, these samples are also available to module 46 via control lines 92.

In the preferred embodiment, if tuning sequence control module 46 determines the process output signal y(t) is no longer within specifications, module 46 initiates a tuning sequence. In addition, module 46 may initiate a tuning sequence based on other conditions, such as detecting a set point change in the signal r(t). As used herein, the term tuning sequence refers to all steps necessary to calculate new controller parameters and provide the controller parameters to controller 40 via line 41.

In one embodiment, module 46 initiates a tuning sequence when the absolute magnitude of the error signal e(t) becomes twice as large as the noise band of the error signal, where the noise band is measured when the system has not been disturbed for a sufficiently long period of time. If module 46 determines that the process has become too oscillatory or unstable to complete a tuning sequence, then the PID parameters of controller 40 can be adjusted as follows:

$$K_{CNew} = 0.5 K_{CPrev},$$

$$T_{INew} = 2 T_{IPrev},$$

and $$T_{DNew} = 0.$$

This adjustment will be repeated until the system becomes stable. After recovery from instability, then module 46 may complete the tuning sequence.

During a tuning sequence, process gain and phase lag calculation module 42 measures the gain and phase lag of the output signal y(t) with respect to the input signal u'(t) at least one, and possibly several, observation frequencies. To ensure an accurate measurement, both signals must contain frequency components centered around the frequencies at which the measurements will be made. A set point change that comprises a step change in the signal r(t) provides an ideal opportunity to perform a tuning sequence because the step change introduces a broad spectrum of frequencies into the signals u'(t) and y(t). Accordingly, it may be desirable to initiate a tuning sequence after detecting a set point change, even if the quality of process control is within specification. Likewise, if process 38 is subjected to a sudden load disturbance, the signals u'(t) and y(t) may contain a broad spectrum of frequencies. However, unlike a set point change in the signal r(t), a load disturbance introduces into the control loop a more limited spectrum of frequencies at lower power levels, which may limit the opportunity to obtain an accurate measurement.

If a set point change or load disturbance has been detected and is suitable for performing the measurements, a tuning sequence is initiated. In one embodiment, a tuning sequence may be performed until the absolute magnitude of the error signal e(t) becomes less than twice the magnitude of the noise band of the error signal for more than a period of 0.5 $T_u$. Once these conditions are reached, process excitation will be too small to continue the tuning sequence.

However, if a set point change or load disturbance is not present, and a tuning sequence is desired, switch 50 and module 48 can be manipulated under control of tuning sequence control module 46 to inject an excitation signal into the control loop. The excitation signal can be injected into the set point signal r(t) at adder 54, the error signal e(t) at adder 56, the control signal u(t) at adder 58, or the output signal y(t) at adder 60. In one embodiment of the present invention, the excitation signal consists of a sum of sinusoidal signals, with each sinusoidal signal having a frequency corresponding to a frequency being observed by process gain and phase lag module 42. In other embodiments, the excitation signal may comprise a step change signal, an impulse signal, or white noise.

As discussed above, process gain and phase lag calculation module 42 measures the gain and phase lag of the output signal y(t) with respect to the input signal u'(t) at least one observation frequency. Based on these measurements, ultimate gain ($K_U$) and ultimate period ($T_U$) calculation module 44 will either calculate the ultimate gain $K_U$ and ultimate period $T_U$, or, in cooperation with tuning sequence module 46, will continue the tuning sequence by requesting module 42 to perform additional measurements.

After the ultimate gain $K_U$ and ultimate period $T_U$ have been calculated, module 46 calculates updated parameters for controller 40 using methods which are known in the art, such as the Ziegler-Nichols method (or modifications thereof). Once the updated parameters are calculated, module 46 completes the tuning sequence by providing the updated parameters to controller 40. Module 46 also performs other functions, such as validating calculated parameters and ensuring that parameters do not change too abruptly.

In one embodiment, module 46 ensures that after every set point change or load disturbance, $K_C$ is not allowed to increase by more than 30%, $T_I$ is not allowed to decrease by more than 30%, and $T_D$ is changed in such a way that the ratio of $T_I$ with respect to $T_D$ remains constant. As a final precaution, the total amount of change in each of the controller parameters cannot exceed the values obtained from relay auto tuning by more than a factor of four. For example, if the proportional gain $K_{CPrev}$ obtained from relay auto tuning is 4, then $K_{CNew}$ must be between 1 and 16.

The apparatus shown in FIG. 4 can be operated in an interpolation mode or in a tracking mode. While both modes are executed using similar hardware, different methods are required to implement the two modes.

The interpolation method calculates a new ultimate gain $K_U$, and a new ultimate period $T_U$ by measuring the gains and phase lags of process 38 at two or more observation frequencies, and interpolating between the measured gains and interpolating between the measured phase lags. A first phase lag must be less than 180° and a second phase lag must be greater than 180°.

Assume that the ultimate gain $K_U$ and the ultimate period $T_U$ of process 38 are measured by relay auto tuning when the process transfer function $G_p(i\omega)$ of process 38 is equal $G_2(i\omega)$ in FIG. 3. The ultimate period will be:

$$T_U = \frac{2\pi}{\omega_2}.$$

Assume further that the process transfer function $G_p(i\omega)$ of process 38 has changed and is now equal $G_3(i\omega)$ in FIG. 3. The ultimate frequency $\omega_U$ is no longer $\omega_2$, but lies between $\omega_1$ and $\omega_2$. If the gain and phase lag of process 38 are measured at frequencies $\omega_1$ and $\omega_2$ by process gain and phase lag calculation module 42, the new ultimate frequency $\omega_{UNew}$ can be calculated from these measurements by interpolation.

Figure 5:
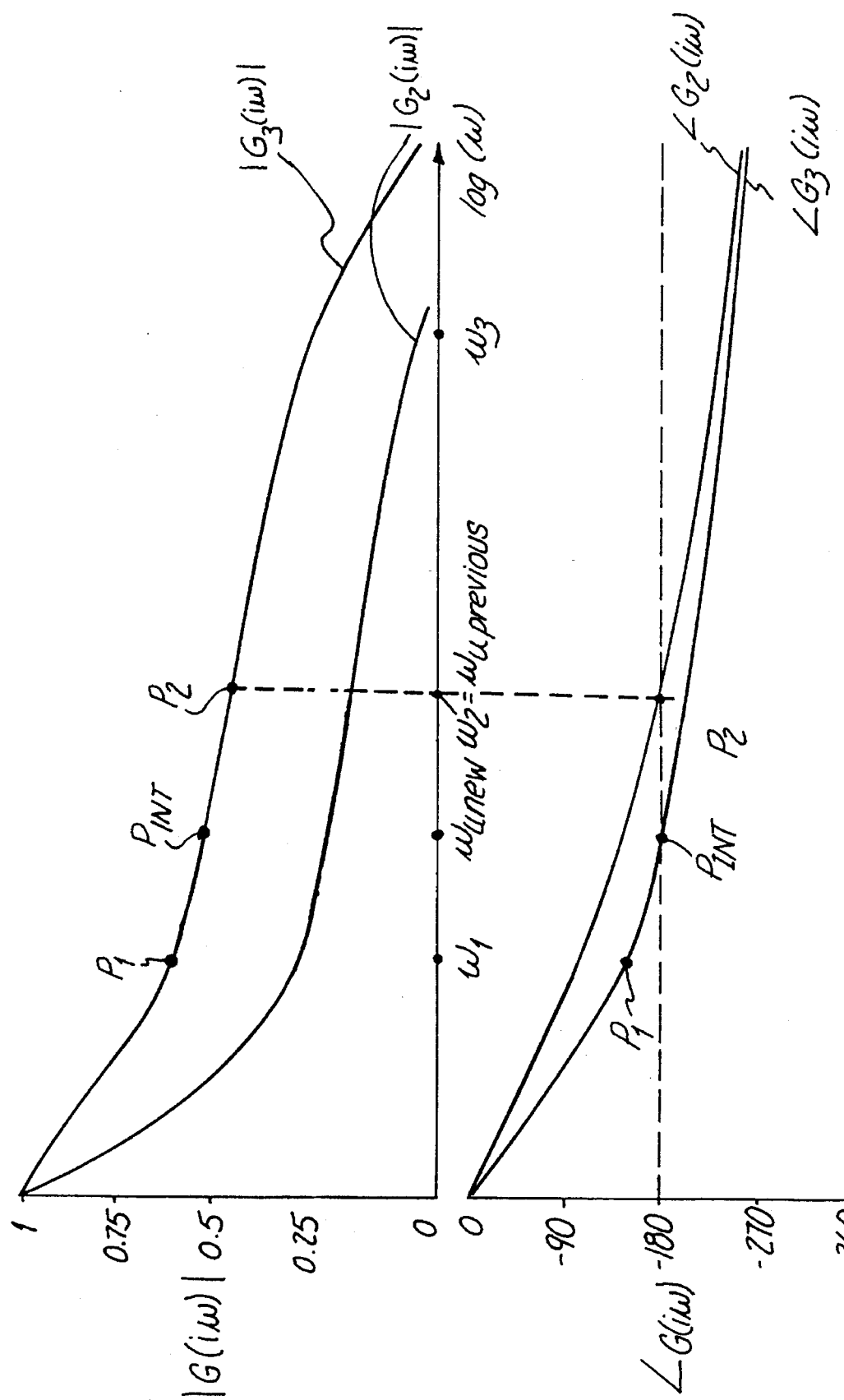
FIG. 5 is a Bode plot of two of the transfer functions shown in FIG. 3.

FIG. 5 is a Bode plot of the transfer functions $G_2(i\omega)$ and $G_3(i\omega)$, which correspond to the same transfer functions shown in the Nyquist plot of FIG. 3. The horizontal axis represents the frequency $\omega$ plotted along a logarithmic scale. The upper part of the plot shows the magnitude of the transfer function $|G(i\omega)|$ versus frequency in the logarithmic scale and the lower part of the graph shows the phase lag of the transfer function $<G(i\omega)$ (in degrees) versus frequency in the logarithmic scale.

The curve $<G_2(i\omega)$ has a phase lag of 180° at frequency $\omega_2$, as was measured by relay auto tuning. However, the curve $<G_3(i\omega)$ has a phase lag of 180° at the frequency of point $P_{INT}$, which is between points $P_1$ and $P_2$. The new ultimate frequency $\omega_{UNew}$ can be calculated from points $P_1$ and $P_2$ on curve $<G_3(i\omega)$ by interpolation.

Once the new ultimate frequency $\omega_{UNew}$ has been calculated, it can be used along with points $P_1$ and $P_2$ to calculate the point $P_{INT}$ curve $|G_3(i\omega)|$ by interpolation, thereby identifying the reciprocal of the ultimate gain.

Figure 6:
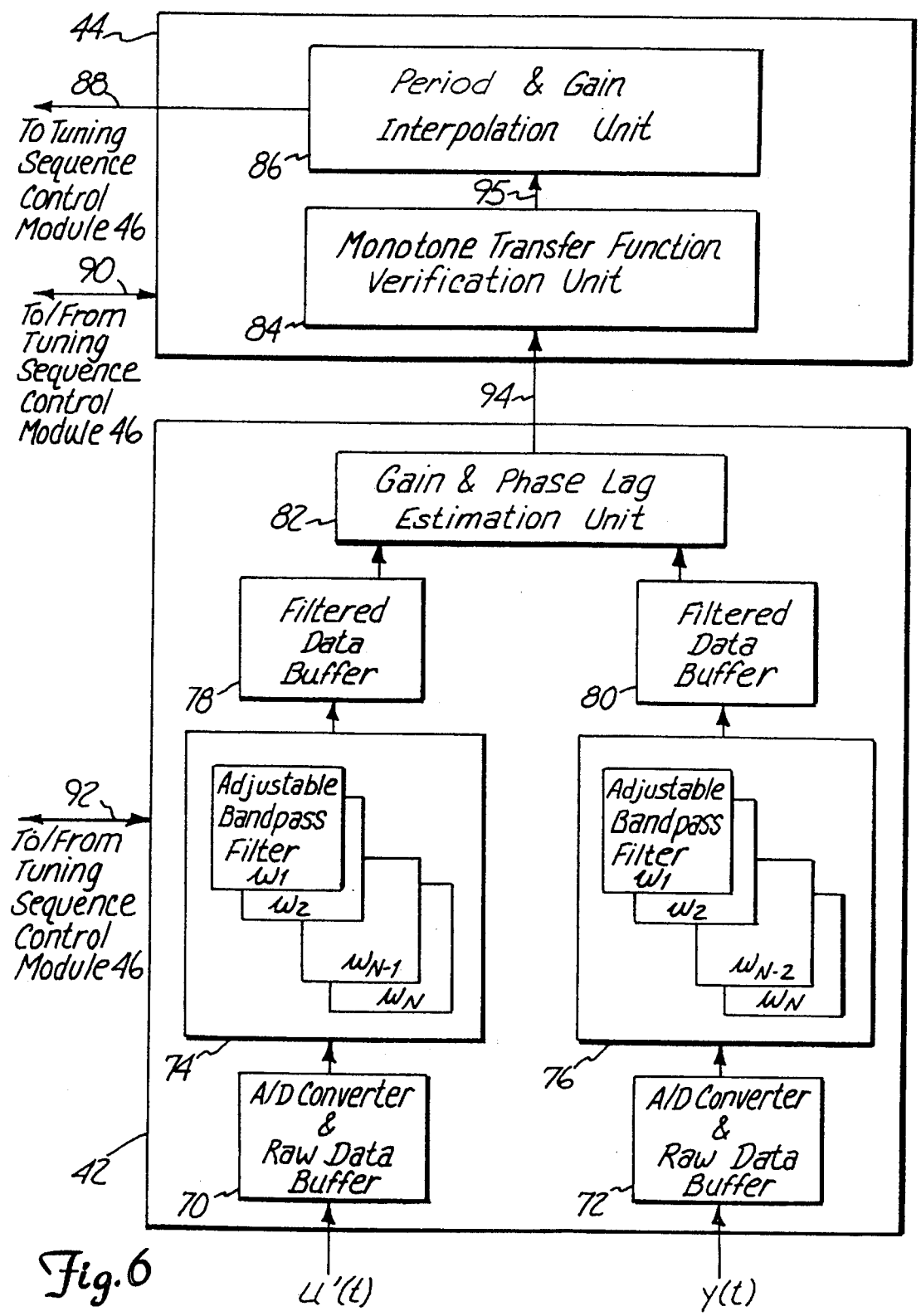
FIG. 6 is a detailed block diagram of a process gain and phase lag calculation module and a ultimate gain ($K_U$) and ultimate period ($T_U$) calculation module shown in FIG. 4 and configured to calculate the ultimate gain ($K_U$) and ultimate period ($T_U$) using the interpolation method of the present invention.

FIG. 6 is a detailed block diagram of process gain and phase lag calculation module 42 and ultimate gain ($K_U$) and ultimate period ($T_U$) calculation module 44 of FIG. 4 configured to calculate the ultimate gain ($K_U$) and ultimate period ($T_U$) using the interpolation method. Module 42 is comprised of A/D converter and raw data buffers 70 and 72, adjustable bandpass filter banks 74 and 76, filtered data buffers 78 and 80, and gain and phase lag estimation unit 82. Module 44 is comprised of monotone transfer function verification unit 84 and period and gain interpolation unit 86. Module 42 is coupled to tuning sequence control module 46 via line 92 and module 44 is coupled to module 46 via line 90. In addition, unit 86 provides module 46 with calculated values for the ultimate gain ($K_U$) and ultimate period ($T_U$) via line 88.

A/D converter and raw data buffer 70 samples signal u'(t) and converts the signal into digital data, which are stored in buffer 70. Likewise, A/D converter and raw data buffer 72 samples signal y(t), converts the signal into digital data, and stores the data in buffer 72. A/D converter and raw data buffers 70 and 72 must hold enough data to analyze the lowest frequency of interest, and must sample the signals fast enough to resolve the highest frequency of interest.

When a tuning sequence is initiated by tuning sequence control module 46, buffers 70 and 72 store samples of signals u'(t) and y(t), respectively. The stored data are then filtered by adjustable bandpass filter banks 74 and 76. Each bank is comprised of N adjustable bandpass filters, which are preferably digital filters as are known in the art. Within filter bank 74, each adjustable bandpass filter is configured to filter at a unique observation frequency the data stored in the raw data buffers 70. Each filter in bank 74 has a corresponding filter in bank 76, with corresponding filters filtering at the same observation frequency.

Under control of module 46, the sampled signals from u'(t) and y(t) are bandpass filtered at a selected observation frequency $\omega_i$ and stored in filtered data buffers 78 and 80, respectively, with sampled signals filtered at the same observation frequency forming a corresponding pair. After the filtered data are stored in buffers 78 and 80, gain and phase lag estimation unit 82 estimates the gain and phase lag of process 38 at the observation frequency $\omega_i$, and these values are provided to monotone transfer function verification unit 84 via line 94. This process is repeated for each of the remaining N observation frequencies.

Unit 82 may be configured to estimate the gain and phase lag by a variety of methods that are known in the art, such as the recursive least square estimators method, direct calculation, or a limited Fourier transform performed at the particular frequency of interest.

Unit 84 verifies that the transfer function $G_p(i\omega)$ is a monotone function of frequency for the frequencies measured. Basically, this means that as the frequency $\omega$ increases, the gain decreases and the phase lag increases. This will be discussed in greater detail below.

Period and gain interpolation unit 86 receives the gains and phase lags of process 38 at the observation frequencies via line 95. Unit 86 isolates first and second corresponding pairs having phase lags closest to and on opposite sides of the 180° phase lag line in FIG. 5, and calculates the ultimate gain ($K_U$) and the ultimate period ($T_U$) by interpolation based on the observation frequencies corresponding to the first and second corresponding pairs, and the phase lags of the first and second corresponding pairs. The ultimate gain ($K_U$) and the ultimate period ($T_U$) are then provided to tuning sequence control module 46 via line 88.

Figure 7:
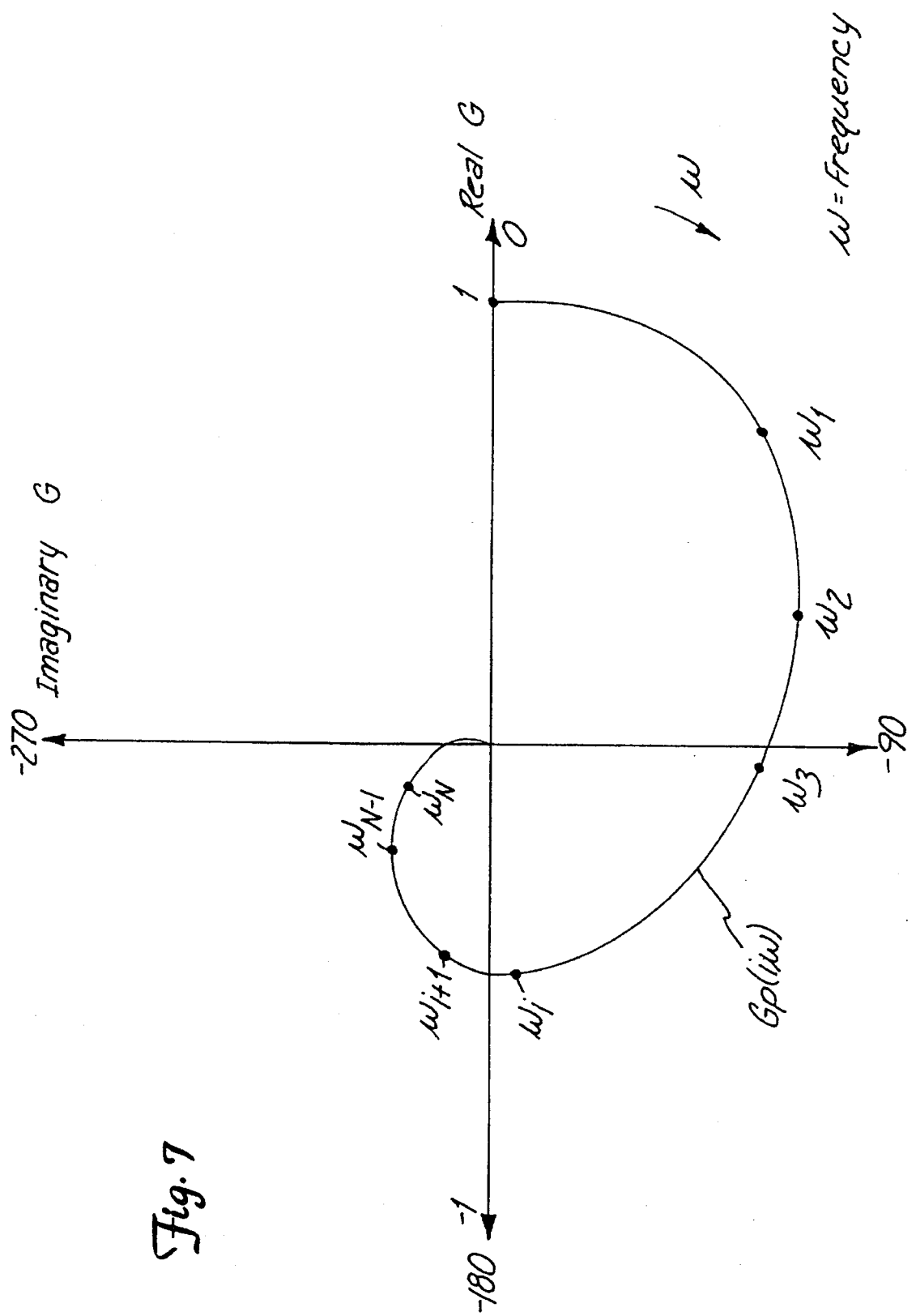
FIG. 7 is a Nyquist plot showing N frequencies labeled on an unknown transfer function $G_p(i\omega)$.

In one embodiment, the interpolation method is defined as follows. Let N points on the Nyquist plot of an unknown transfer function $G_p(i\omega)$ of process 38 be represented by $$P_k = A_k, <\phi_k,$$

where k=1, 2, 3, ..., N, and $A_k$ and $\phi_k$ are the amplitude and phase lag of the point $P_k$, respectively, as shown in FIG. 7.

The value of the previously calculated ultimate frequency for the previously known transfer function is $\omega_{UPrev}$ and the center frequencies of the adjustable bandpass filters of banks 74 and 76 are configured as follows:

$$\omega_1 = a^{m-1}\omega_{UPrev}$$
$$\omega_2 = a^{m-2}\omega_{UPrev}$$
$$\vdots$$
$$\omega_{N-1} = a^{m-N-1}\omega_{UPrev}$$
$$\omega_N = a^{m-N}\omega_{UPrev},$$

for 0<α<1, where $$m=N/2,$$

if N is even, and $$m = \frac{N+1}{2},$$

if N is odd, and $\alpha$ is a design parameter that determines the frequency spacing between the observation frequencies $\omega_1$, $\omega_2, \ldots, \omega_N$.

Gain and phase lag estimation unit 82 estimates the gain and phase lag of process 38 at each of the N observation frequencies, and provides this information to monotone transfer function verification unit 84. Unit 84 ensures that for $\omega_1 < \omega_2 \ldots \omega_N$:

$$A_1 > A_2 > \ldots > A_N,$$

and $$\phi_1 < \phi_2 < \ldots < \phi_N.$$

If the estimated gains and phase lags do not meet these restrictions, then the transfer function is not a monotone function of frequency and the interpolation method may not provide an accurate estimation of the ultimate gain ($K_U$) and ultimate period ($T_U$).

If the estimated gains and phase lags meet these restrictions, then period and gain interpolation unit 86 identifies corresponding pairs having phase lags immediately greater than and immediately less than 180°. If none of the corresponding pairs have a phase lag greater than 180°, the value of $\omega_{U_{Prev}}$ is assigned the value of $\omega_1$, and the bandpass filters are adjusted accordingly. Likewise, if none of the corresponding pairs have a phase lag less than 180°, the value of $\omega_{U_{Prev}}$ is assigned the value of $\omega_N$, and the bandpass filters are adjusted accordingly.

In FIG. 7, two frequencies associated with corresponding pairs having phase lags immediately greater than and immediately less than 180° are labeled $\omega_i$ and $\omega_{i+1}$, where $1 \leq i \leq N-1$. Unit 86 then interpolates between frequencies 107 $_i$ and $\omega_{i+1}$ to find the new ultimate frequency $\omega_{U_{New}}$ by applying the equation:

$$\log(\omega_{U_{New}}) = \frac{\log(\omega_{i+1}) - \log(\omega_i)}{(\phi_{i+1} - \phi_i)} (180° - \phi_i) + \log(\omega_i).$$

Note that the phases are scaled to convert positive phase lags in degrees into phase angles in negative radians.

Once the new ultimate frequency has been calculated, Unit 86 calculates the ratio of the output amplitude with respect to the input amplitude at the new ultimate frequency $\omega_{U_{New}}$ by applying the equation:

$$\log(A_{U_{New}}) = \frac{\log(A_{i+1}) - \log(A_i)}{\log(\omega_{i+1}) - \log(\omega_i)} [(\log(\omega_{U_{New}}) - \log(\omega_i)] + \log(A_i).$$

The ultimate period, $T_{U_{New}}$, and the ultimate gain, $K_{U_{New}}$, are determined as follows:

$$T_{U_{New}} = \frac{2\pi}{\omega_{U_{New}}}$$

and $$K_{U_{New}} = \frac{1}{A_{U_{New}}}.$$

These values are then provided to module 46 via line 88. Module 46 calculates new controller parameters settings based on these values, verifies that the settings are acceptable as described above, and completes the tuning sequence by supplying the settings to controller 40.

The interpolation method has a number of good properties, especially when more than two observation frequencies are used. When more than two observation frequencies are used, low frequency load disturbances and high frequency noise may affect the measurement performed at the lowest and highest of the N frequencies, respectively, but the phases and signal gains of the corresponding pairs corresponding to those frequencies are generally not used to calculate the ultimate gain and the ultimate period. The corresponding pairs that are used to calculate the ultimate gain and ultimate period have phase lags immediately greater and less than 180°, and are generally not affected by low frequency load disturbances and high frequency noise.

The estimation can also be easily validated. For most industrial processes, the phase and amplitude of the Nyquist curve are monotone functions of frequency. If the estimated results are not monotone functions, they can be rejected. Other advantages of the method include relative simplicity and fast calculation of the ultimate period and ultimate gain. In addition, the method does not require external excitation signals when performed immediately after a set-point change or a load disturbance.

Figure 8:
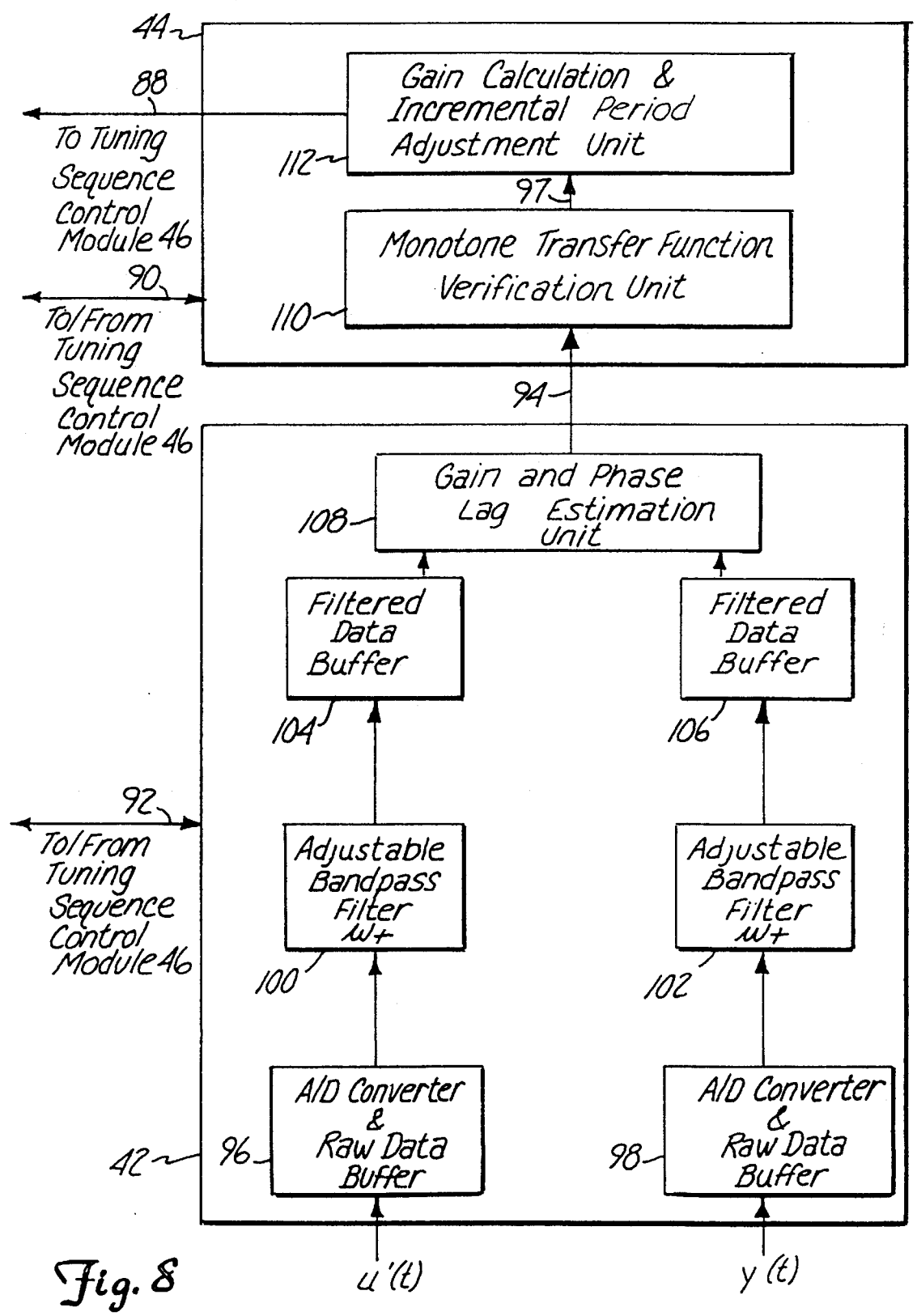
FIG. 8 is a detailed block diagram of the process gain and phase lag calculation module and the ultimate gain ($K_U$) and ultimate period ($T_U$) calculation module of FIG. 4 configured to converge on the ultimate gain ($K_U$) and ultimate period ($T_U$) using the tracking method.

FIG. 8 is a detailed block diagram of process gain and phase lag calculation module 42 and ultimate gain ($K_U$) and ultimate period ($T_U$) calculation module 44 of FIG. 4 configured to converge on the ultimate gain ($K_U$) and ultimate period ($T_U$) using the tracking method. Module 42 is comprised of A/D converter and raw data buffers 96 and 98, bandpass filters 100 and 102, filtered data buffers 104 and 106, and gain and phase lag estimation unit 108. Module 44 is comprised of monotone transfer function verification unit 110 and gain calculation and incremental period adjustment unit 112. Module 42 is coupled to tuning sequence control module 46 via line 92 and module 44 is coupled to module 46 via line 90. In addition, unit 112 provides module 46 with values for the ultimate gain ($K_U$) and ultimate period ($T_U$) via line 88. The values provided by unit 112 converge on the actual values of the ultimate gain ($K_U$) and ultimate period ($T_U$) as the tracking method proceeds.

A/D converter and raw data buffer 96 samples signal u'(t) and converts the signal into digital data, which are stored in buffer 96. Likewise, A/D converter and raw data buffer 98 samples signal y(t), converts the signal into digital data, and stores the data in buffer 98.

In a first mode of operation, a response of process 38 to a natural set point change or a natural load disturbance (or alternatively, a step or impulse excitation signal injected by excitation signal module 48 and switch 50 in FIG. 4) is captured in buffers 96 and 98. Such a response contains a broad spectrum of frequencies. In the first mode, the tracking method is performed by repeatedly examining the data stored in buffers 96 and 98 at a variety of tracking observation frequencies until the ultimate frequency and ultimate gain are identified. As used herein, the phase "tracking observation frequency" denotes the frequency at which the phase of the process transfer function is being observed. A/D converter and raw data buffers 96 and 98 must hold enough data to analyze the lowest frequency of interest, and must sample the signals fast enough to resolve the highest frequency of interest.

In a second mode of operation, an excitation signal is injected into the control loop by excitation signal module 48 and switch 50 of FIG. 4. In the second mode of operation, the excitation signal consists of a single sinusoidal signal at a tracking observation frequency. Therefore, A/D converter and raw data buffers 96 and 98 need only hold enough data and sample the signals fast enough to resolve and analyze the tracking observation frequency.

When a tuning sequence is initiated by tuning sequence control module 46, buffers 96 and 98 store samples of signals u'(t) and y(t), respectively. Under control of module 46, the sampled signals from u'(t) and y(t) are bandpass filtered by filters 100 and 102 at a tracking frequency $\omega_T$ to form a corresponding pair, and are stored in filtered data buffers 104 and 106, respectively. Filters 100 and 102 are preferably digital filters, as are known in the art.

When a tuning sequence using the tracking method is initiated, the tracking frequency $\omega_T$ will typically initially be set to the previously measured ultimate frequency $\omega_{UPrev}$. In the second mode of operation, module 46 will have previously configured excitation signal module 48 and switch 50 to inject into the control loop a sinusoidal signal having a frequency equal to the tracking observation frequency $\omega_T$.

After the filtered data are stored in buffers 104 and 106, gain and phase lag estimation unit 108 estimates the gain and phase lag of process 38 at the tracking observation frequency $\omega_T$, and these values are provided to monotone transfer function verification unit 110 via line 94.

Unit 108 may be configured to estimate the gain and phase lag by a variety of methods which are known in the art, such as the recursive least square estimators method, direct calculation, or a limited Fourier transform performed at the particular frequency of interest.

Unit 110 verifies that the transfer function $G_p(i\omega)$ is a monotone function of frequency for the tracking observation frequencies measured. Basically, this means that as the frequency $\omega$ increases, the gain decreases and the phase lag increases. However, unlike monotone transfer function verification unit 84 in FIG. 6, unit 110 only receives the gain and phase lag of one tracking observation frequency ($\omega_T$) at a time. If the first iteration of the tracking method converges on the ultimate period, then unit 110 cannot verify that the transfer function $G_p(i\omega)$ is a monotone function of frequency. However, if the tracking method must perform more than one iteration, unit 110 can verify that $G_p(i\omega)$ is a monotone function of frequency for all tracking observation frequencies measured.

Gain calculation and incremental period adjustment unit 112 receives the gain and phase lag of process 38 at the tracking observation frequency via line 97. Unit 112 determines whether the phase lag of process 38 at the tracking observation frequency $\omega_T$ is less than or greater than 180° by a predetermined quantity. If the phase lag is within the predetermined quantity, then the new ultimate period is:

$$T_{UNew} = \frac{2\pi}{\omega_T},$$

and the ultimate gain is determined by applying the equation:

$$K_{UNew} = \frac{1}{A_T},$$

where $A_T$ is the is the ratio of the amplitude of y(t) with respect to the amplitude of u'(t) at the tracking observation frequency $\omega_T$. Note that the ultimate gain may change even though the ultimate period remains unchanged. The ultimate gain ($K_U$) and the ultimate period ($T_U$) are then provided to tuning sequence control module 46 via line 88 and module 46 completes the tuning sequence by calculating the controller parameters and providing them to controller 40 via line 41.

If the phase lag of process 38 at the tracking observation frequency $\omega_T$ is greater than or less than 180° by more than the predetermined quantity, then a new ultimate period is calculated by applying the equation:

$$T_{UNew} = \frac{2\pi}{\omega \pm \Delta\omega_{INC}}.$$

In one embodiment, the magnitude of the frequency increment $\Delta\omega_{INC}$ is proportional to the phase lag difference $\Delta\phi$ between 180° and the phase lag of the corresponding pair corresponding to the tracking observation frequency. For example, $$\Delta\omega_{INC} = \frac{\xi\omega_T |\Delta\phi|}{180°},$$

where $\xi$ is an experimentally selected scaling factor and $0 < \xi < 1$.

The new ultimate period and gain are then provided to tuning sequence control module 46 via line 88.

If unit 112 calculated a new ultimate period by adding or subtracting a frequency increment from the test frequency $\omega_T$ because the phase lag of process 38 at the tracking observation frequency $\omega_T$ is greater than or less than 180° by more than the predetermined quantity, then it is possible that the calculated ultimate period is not equal to the actual ultimate period of the process. If this is the case, then module 46 can direct modules 42 and 44 to continue the tuning sequence by performing another iteration.

If the tracking method is being performed in the first mode of operation, then adjustable bandpass filters 100 and 102 are adjusted to a tracking observation frequency equal to $2\pi$ divided by the ultimate period calculated in the last iteration, and the method is repeated using the data stored in buffers 96 and 98. Since these data represents samples of signals containing a broad spectrum of frequencies, they may be used repeatedly until the calculated ultimate period and ultimate gain converge on the actual ultimate period and ultimate gain.

If the tracking method is being performed in the second mode of operation, then module 46 must configure excitation signal module 48 and switch 50 to inject into the control loop a sinusoidal excitation signal having a frequency equal to $2\pi$ divided by the ultimate period calculated in the last iteration. A/D converter and raw data buffers 96 and 98 sample the signals u'(t) and y(t), respectively. The data samples are filtered at the new observation frequencies by adjustable bandpass filters 100 and 102 to form the corresponding pair, and the resulting data are stored in filtered data buffers 104 and 106. The gain and phase lag of the corresponding pair are estimated by unit 108. Verification unit 110 verifies that the transfer function $G_p(i\omega)$ is a monotone function of frequency, and unit 112 calculates the ultimate gain and the ultimate period. If the phase lag differs from 180° by more than a predetermined quantity, the process is repeated until the calculated ultimate period and ultimate gain converge on the actual ultimate period and ultimate gain.

The present invention provides a method and apparatus for determining the ultimate gain and ultimate period of a controlled process without affecting the quality of process control. Once the ultimate gain and ultimate period have been calculated, the process controller parameters are easily updated using methods known in the art, such as the modified Ziegler-Nichols method.

When the apparatus of the present invention is operated in accordance with the interpolation method of the present invention, the transfer function of the process under control is measured at a plurality of observation frequencies, and the ultimate period is determined by interpolation based on the observation frequencies and phase lags of a first corresponding pair having a phase lag greater than 180° and a second corresponding pair having a phase lag less than 180°. By selecting corresponding pairs have phase lags close to, and surrounding 180°, the effects of low frequency load disturbances and high frequency noise are minimized. In addition, it is easy to verify that the transfer function is a monotone function of frequency.

When the apparatus of the present invention is operated in accordance with the tracking method of the present invention, the transfer function is measured at a single tracking observation frequency, and the ultimate period is calculated by adding or subtracting a frequency increment from the tracking observation frequency to form a new ultimate frequency, and dividing $2\pi$ by the new ultimate frequency to determine the new ultimate period. If the phase lag of the process at the tracking observation frequency is less than or greater than, respectively, 180° by more than a predetermined quantity, these steps are repeated until the phase lag is within the predetermined quantity.

Although the tracking method may take longer to find the actual ultimate period than the interpolation method, the tracking method requires fewer filters than the interpolation method, and therefore is more economical. In addition, if the response of the controlled process to a step change is captured in the data buffers, the method can be performed on the same data in the buffer.

Although the present invention has been described with reference to preferred embodiments, workers skilled in the art will recognize that changes may be made in form and detail without departing from the spirit and scope of the invention.

What is claimed is:

1. A method of determining an ultimate period and an ultimate gain of a controlled process, the controlled process having an input for receiving an input signal to control a parameter of the controlled process and an output for providing an output signal representative of the parameter of the controlled process, the method comprising:

selecting at least one observation frequency;

isolating from the input signal an input sample signal corresponding to each observation frequency;

isolating from the output signal an output sample signal corresponding to each observation frequency, wherein input and output sample signals correspond to a common observation frequency to form a corresponding pair of sample signals;

determining for each corresponding pair a phase lag of the output sample signal of the corresponding pair with respect to the input sample signal of the corresponding pair;

determining for each corresponding pair a signal gain of the output sample signal of the corresponding pair with respect to the input sample signal of the corresponding pair;

determining the ultimate period based on at least one observation frequency and at least one phase lag;

determining the ultimate gain based on at least one signal gain; and modifying the input signal to the controlled process based on the ultimate period and ultimate gain and thereby modifying the control of the parameter of the controlled process.

2. The method of claim 1 wherein selecting at least one observation frequency comprises:

selecting a plurality of observation frequencies;

identifying a first corresponding pair having a phase lag that is less than 180°; and identifying a second corresponding pair having a phase lag that is greater than 180°.

3. The method of claim 2 wherein determining the ultimate period comprises:

interpolating between the phase lag and observation frequency of the first corresponding pair and the phase lag and observation frequency of the second corresponding pair to determine the ultimate period.

4. The method of claim 3 wherein interpolating between the phase lag and observation frequency of the first corresponding pair and the phase lag and observation frequency of the second corresponding pair to determine the ultimate period further comprises applying equations defined as:

$$\log(\omega_{UNew}) = \frac{\log(\omega_{i+1}) - \log(\omega_i)}{(\phi_{i+1} - \phi_i)} (180° - \phi_i) + \log(\omega_i)$$

and $$T_{UNew} = \frac{2\pi}{\omega_{Unew}},$$

wherein $\omega_{UNew}$ represents the new ultimate frequency, $T_{UNew}$ represents the new ultimate period, $\omega_i$ represents the observation frequency corresponding to the first corresponding pair, $\omega_{i+1}$ represents the observation frequency corresponding to the second corresponding pair, $\phi_i$ represents the phase lag of the first corresponding pair, and $\phi_{i+1}$ represents the phase lag of the second corresponding pair.

5. The method of claim 2 wherein determining the ultimate gain comprises:

interpolating between the signal gain and observation frequency of the first corresponding pair and the signal gain and observation frequency of the second corresponding pair, based on ultimate period, to determine the ultimate gain.

6. The method of claim 5 wherein interpolating between the signal gain and observation frequency of the first corresponding pair and the signal gain and observation frequency of the second corresponding pair, based on ultimate period, to determine the ultimate gain further comprises applying two equations defined as:

$$\log(A_U) = \frac{\log(A_{i+1}) - \log(A_i)}{\log(\omega_{i+1}) - \log(\omega_i)} [(\log(\omega_{UNew}) - \log(\omega_i)] + \log(A_i)$$

and $$K_{UNew} = \frac{1}{A_U},$$

wherein $K_{UNew}$ represents the new ultimate gain, $\omega_{UNew}$ represents the new ultimate frequency, $A_U$ represents a signal gain of the controlled process at $\omega_{UNew}$, $A_i$ represents the signal gain of the first corresponding pair, $A_{i+1}$ represents the signal gain of the second corresponding pair, $\omega_i$ represents the observation frequency corresponding to the first corresponding pair, and $\omega_{i+1}$ represents the observation frequency corresponding to the second corresponding pair.

7. The method of claim 2 wherein a previous ultimate period has been determined and selecting a plurality of observation frequencies includes:

selecting a first observation frequency lower than $2\pi$ divided by the previous ultimate period; and selecting a second observation frequency higher than $2\pi$ divided by the previous ultimate period.

8. The method of claim 2 and further comprising:

lowering at least one observation frequency of the plurality of observation frequencies if none of the phase lags of the corresponding pairs are less than 180°; and raising at least one observation frequency of the plurality of observation frequencies if none of the phase lags of the corresponding pairs are greater than 180°.

9. The method of claim 1 wherein selecting at least one observation frequency comprises:

selecting a tracking observation frequency.

10. The method of claim 9 wherein a previous ultimate period has been determined and selecting a tracking observation frequency comprises:

setting the tracking observation frequency approximately equal to $2\pi$ divided by the previous ultimate period.

11. The method of claim 9 wherein determining the ultimate period comprises:

setting the ultimate period approximately equal to $2\pi$ divided by the tracking observation frequency if the phase lag of the corresponding pair associated with the tracking observation frequency does not differ from 180° by more than a predetermined quantity;

determining the ultimate period by dividing $2\pi$ by a sum of the tracking observation frequency and a frequency increment if the phase lag of the corresponding pair associated with the tracking observation frequency is less than 180° by more than the predetermined quantity; and determining the ultimate period by dividing $2\pi$ by a difference of the tracking observation frequency minus the frequency increment if the phase lag of the corresponding pair associated with the tracking observation frequency is more than 180° by more than the predetermined quantity.

12. The method of claim 11 wherein determining the ultimate period by dividing $2\pi$ by a sum and determining the ultimate period by dividing $2\pi$ by a difference each further comprise:

setting the tracking observation frequency to $2\pi$ divided by the ultimate period; and repeating determining the ultimate period based on at least one observation frequency and at least one phase lag.

13. The method of claim 1 wherein a controller input of a controller receives a feedback signal derived from the output signal of the controlled process, and a controller output of the controller is coupled to the input of the controlled process, thereby forming a control loop, and isolating from the input signal and isolating from the output signal are performed upon detecting a change in the control loop.

14. The method of claim 1 wherein isolating from the input signal an input sample signal corresponding to each observation frequency comprises:

bandpass filtering the input signal at each observation frequency.

15. The method of claim 1 wherein isolating from the output signal an output sample signal corresponding to each observation frequency comprises:

bandpass filtering the output signal at each observation frequency.

16. The method of claim 1 wherein a controller input of a controller receives a feedback signal derived from the output signal of the controlled process, and a controller output of the controller is coupled to the input of the controlled process, thereby forming a control loop, and the method further comprises:

superimposing onto the control loop an excitation signal.

17. The method of claim 1 wherein at least two pairs of sample signals are isolated and one pair of sampled signals has a phase lag less than 180° and the other pair of sample signals has a phase lag greater than 180°.

18. An apparatus for automatically tuning a controller (40) in a controlled process loop (36), wherein the controlled process loop (36) includes a process (38) having a process input for receiving a control signal u(t) to control a process parameter of the process (38) and a process output for providing a process output signal y(t) representative of the process parameter, and the controller (40) having a controller output for providing the control signal u(t), and a controller input for receiving an error signal e(t) derived from the process output signal y(t), wherein control characteristics of the controller (40) are defined by controller parameters, the apparatus comprising:

a tuning sequence control module (46) coupled to the controller (40), the tuning sequence control module (46) comprising:

observation frequency selection means for selecting at least one observation frequency;

controller parameter determination means for determining controller parameters based on an ultimate gain and an ultimate period; and parameter update means for providing controller parameters to controller (40);

a process gain and phase lag calculation module (42) coupled to the tuning sequence control module (46), the control signal u(t), and the process output signal y(t), the process gain and phase lag calculation module (42) comprising:

control signal filtering means for isolating from the control signal u(t), a control sample signal corresponding to each observation frequency;

process output signal filtering means for isolating from the process output signal y(t) a process output sample signal corresponding to each observation frequency, wherein control sample signals and process output sample signals correspond to a common observation frequency to form a corresponding pair;

phase lag determination means for determining for each corresponding pair a phase lag of the process output sample signal of the corresponding pair with respect to the control sample signal of the corresponding pair; and signal gain determination means for determining for each corresponding pair a signal gain of the process output sample signal of the corresponding pair with respect to the control sample signal of the corresponding pair; and an ultimate gain and ultimate period calculation module (44) coupled to the process gain and phase lag calculation module (42) and the tuning sequence control module (46), the ultimate gain and ultimate period calculation module (44) comprising:

ultimate period determination means for determining the ultimate period based on at least one observation frequency and at least one phase lag; and ultimate gain determination means for determining the ultimate gain based on at least one signal gain.

19. The apparatus of claim 18 wherein the observation frequency selection means of the tuning sequence control module (46) comprises:

means for selecting a plurality of observation frequencies.

20. The apparatus of claim 19 wherein the ultimate gain and ultimate period calculation module (44) comprises:
- a period and gain interpolation unit (86) comprising:
  - means for identifying a first corresponding pair having a phase lag that is less than 180°;
  - means for identifying a second corresponding pair having a phase lag that is greater than 180°; and
  - means for determining the ultimate period by interpolation based on the phase lags of the first and second corresponding pairs and the observation frequencies corresponding to the first and second corresponding pairs.

21. The apparatus of claim 20 wherein the means for determining the ultimate period by interpolation based on the phase lags of the first and second corresponding pairs and the observation frequencies corresponding to the first and second corresponding pairs comprises applying an equation defined as:

$$\log(\omega_{UNew}) = \frac{\log(\omega_{i+1}) - \log(\omega_i)}{(\phi_{i+1} - \phi_i)} (180° - \phi_i) + \log(\omega_i)$$

and $$T_{UNew} = \frac{2\pi}{\omega_{UNew}},$$

wherein $\omega_{UNew}$ represents the new ultimate frequency, $T_{UNew}$ represents the new ultimate period, $\omega_i$ represents the observation frequency corresponding to the first corresponding pair, $\omega_{i+1}$ represents the observation frequency corresponding to the second corresponding pair, $\phi_i$ represents the phase lag of the first corresponding pair, and $\phi_{i+1}$ represents the phase lag of the second corresponding pair.

22. The apparatus of claim 20 wherein the period and gain interpolation unit (86) further comprises:
- means for determining the ultimate gain by interpolation based on the signal gains of the first and second corresponding pairs, the observation frequencies corresponding to the first and second corresponding pairs, and the ultimate period.

23. The apparatus of claim 22 wherein the means for determining the ultimate gain by interpolation based on the signal gains of the first and second corresponding pairs, the observation frequencies corresponding to the first and second corresponding pairs, and the ultimate period further comprises applying two equations defined as:

$$\log(A_U) = \frac{\log(A_{i+1}) - \log(A_i)}{\log(\omega_{i+1}) - \log(\omega_i)} [(\log(\omega_{UNew}) - \log(\omega_i)] + \log(A_i)$$

and $$K_{UNew} = \frac{1}{A_U},$$

wherein $K_{UNew}$ represents the new ultimate gain, $\omega_{UNew}$ represents $2\pi$ divided by the ultimate period, $A_U$ represents a signal gain of the controlled process at $\omega_{UNew}$, $A_i$ represents the signal gain of the first corresponding pair, $A_{i+1}$ represents the signal gain of the second corresponding pair, $\omega_i$ represents the observation frequency corresponding to the first corresponding pair, and $\omega_{i+1}$ represents the observation frequency corresponding to the second corresponding pair.

24. The apparatus of claim 19 wherein a previous ultimate period has been determined and the means for selecting a plurality of observation frequencies includes:
- means for selecting a first observation frequency lower than $2\pi$ divided by the previous ultimate period; and
- means for selecting a second observation frequency higher than $2\pi$ divided by the previous ultimate period.

25. The apparatus of claim 19 wherein the means for selecting a plurality of observation frequencies includes:
- means for lowering at least one observation frequency of the plurality of observation frequencies if none of the phase lags of the corresponding pairs are less than 180°; and
- means for raising at least one observation frequency of the plurality of observation frequencies if none of the phase lags of the corresponding pairs are greater than 180°.

26. The apparatus of claim 19 wherein the control signal filtering means of the process gain and phase lag calculation module (42) comprises:
- a plurality of adjustable bandpass filters (74), with each bandpass filter controlled by the tuning sequence control module (46) to have a center frequency corresponding to an observation frequency.

27. The apparatus of claim 26 wherein the plurality of adjustable bandpass filters (74) are digital filters and the control signal filtering means of the process gain and phase lag calculation module (42) further comprises:
- an analog-to-digital converter and raw data buffer (70) coupled to the control signal u(t) and the plurality of adjustable bandpass filters (74), for receiving the control signal u(t) in an analog form and providing to the plurality of adjustable bandpass filters (74) a digital data stream representative of the control signal u(t); and
- a filtered data buffer (78) coupled to the plurality of adjustable bandpass filters (74), the phase lag determination means, and the signal gain determination means, for storing filtered data from the plurality of adjustable bandpass filters (74) and providing filtered data to the phase lag determination means and the signal gain determination means.

28. The apparatus of claim 19 wherein the process output signal filtering means of the process gain and phase lag calculation module (42) comprises:
- a plurality of adjustable bandpass filters (76), with each bandpass filter controlled by the tuning sequence control module (46) to have a center frequency corresponding to an observation frequency.

29. The apparatus of claim 28 wherein the plurality of adjustable bandpass filters (76) are digital filters and the process output signal filtering means of the process gain and phase lag calculation module (42) further comprises:
- an analog-to-digital converter and raw data buffer (72) coupled to the process output signal y(t) and the plurality of adjustable bandpass filters (76), for receiving the process output signal y(t) in an analog form and providing to the plurality of adjustable bandpass filters (76) a digital data stream representative of the process output signal y(t); and
- a filtered data buffer (80) coupled to the plurality of adjustable bandpass filters (76), the phase lag determination means, and the signal gain determination means, for storing filtered data from the plurality of adjustable bandpass filters (76) and providing filtered data to the phase lag determination means and the signal gain determination means.

30. The apparatus of claim 19 wherein the ultimate gain and ultimate period calculation module (44) further comprises:
- a monotone transfer function verification unit (84) arranged to receive gains and phase lags of corresponding pairs from the process gain and phase lag calculation module (42), for verifying that a transfer function of the process is a monotone function of frequency at all observation frequencies.

31. The apparatus of claim 18 wherein the observation frequency selection means of the tuning sequence control module (46) comprises:

means for selecting a tracking observation frequency.

32. The apparatus of claim 31 wherein the means for selecting a tracking observation frequency comprises:

means for setting the tracking observation frequency approximately equal to $2\pi$ divided by a previously determined ultimate period.

33. The apparatus of claim 31 wherein the ultimate period determination means of the ultimate gain and ultimate period calculation module (44) comprises a gain calculation and incremental ultimate period adjustment unit (112) arranged to receive phase lags and signal gains of corresponding pairs from the process gain and phase lag calculation module (42) and provide the ultimate gain and the ultimate period to tuning sequence control module (46), the gain calculation and incremental period adjustment unit (112) comprising:

means for setting the ultimate period approximately equal to the $2\pi$ divided by the tracking observation frequency if the phase lag of the corresponding pair associated with the tracking observation frequency does not differ from 180° by more than a predetermined quantity;

means for determining the ultimate period by dividing $2\pi$ by a sum of the tracking observation frequency and a frequency increment if the phase lag of the corresponding pair associated with to the tracking observation frequency is less than 180° by more than the predetermined quantity; and means for determining the ultimate period by dividing $2\pi$ by a difference of the tracking observation frequency minus the frequency increment if the phase lag of the corresponding pair associated with to the tracking observation frequency is more than 180° by more than the predetermined quantity.

34. The apparatus of claim 33 wherein the means for determining the ultimate period by dividing $2\pi$ by a sum and the means for determining the ultimate period by dividing $2\pi$ by a difference each further include:

means for setting the tracking observation frequency to $2\pi$ divided by the ultimate period; and repeating means coupled to the means for determining the ultimate period based on at least one observation frequency and at least one phase lag, for determining the ultimate period and ultimate gain until the phase lag of the corresponding pair associated with the tracking observation frequency does not differ from 180° by more than a predetermined quantity.

35. The apparatus of claim 33 wherein the frequency increment is defined as:

$$\Delta\omega_{INC} = \frac{\xi \omega_T |\Delta\phi|}{180°},$$

where $\xi$ is an experimentally selected scaling factor and $0<\xi<1$, $\omega_T$ is the tracking frequency, $\Delta\omega_{INC}$ is the frequency increment, and $\Delta\phi$ is a difference between 180° and the phase lag.

36. The apparatus of claim 33 wherein the control signal filtering means of the process gain and phase lag calculation module (42) comprises:

an adjustable bandpass filter (100) controlled by the tuning sequence control module (46) to have a center frequency corresponding to the tracking observation frequency.

37. The apparatus of claim 36 wherein the adjustable bandpass filter (100) is a digital filter and the control signal filtering means of the process gain and phase lag calculation module (42) further comprises:

an analog-to-digital converter and raw data buffer (96) coupled to the control signal u(t) and the adjustable bandpass filter (100), for receiving the control signal u(t) in an analog form and providing to the adjustable bandpass filter (100) a digital data stream representative of the control signal u(t); and a filtered data buffer (104) coupled to the adjustable bandpass filter (100), the phase lag determination means, and the signal gain determination means, for storing filtered data from the adjustable bandpass filter (100) and providing filtered data to the phase lag determination means and the signal gain determination means.

38. The apparatus of claim 37 wherein the process output signal filtering means of the process gain and phase lag calculation module (42) comprises:

an adjustable bandpass filter (102) controlled by the tuning sequence control module (46) to have a center frequency corresponding to the tracking observation frequency.

39. The apparatus of claim 38 wherein the adjustable bandpass filter (102) is a digital filter and the process output signal filtering means of the process gain and phase lag calculation module (42) further comprises:

an analog-to-digital converter and raw data buffer (98) coupled to the process output signal y(t) and the plurality of adjustable bandpass filters (102), for receiving the process output signal y(t) in an analog form and providing to the adjustable bandpass filter (102) a digital data stream representative of the process output signal y(t); and a filtered data buffer (106) coupled to the adjustable bandpass filters (102), the phase lag determination means, and the signal gain determination means, for storing filtered data from the adjustable bandpass filter (102) and providing filtered data to the phase lag determination means and the signal gain determination means.

40. The apparatus of claim 39 wherein tuning sequence control module (46) repeatedly requests gain calculation and incremental ultimate period adjustment unit (112) to determine a new ultimate period and a new ultimate gain based on a response for the controlled process loop (36) captured in analog-to-digital converter and raw data buffer (96) and analog-to-digital converter and raw data buffer (98) immediately after detecting a step change in the controlled process loop (36).

41. The apparatus of claim 18 and further comprising:

set point means (52) for subtracting the output signal y(t) of the process (38) from a set point signal r(t) to form an error signal e(t) that is provided to the controller input.

42. The apparatus of claim 41 wherein the initiation and control means of the tuning sequence controller (46) further comprises:

means for detecting a set point change; and means for initiating a tuning sequence upon detecting a set point change.

43. The apparatus of claim 18 and further comprising:

an excitation signal generator (48), for superimposing at least one excitation signal on a point in the controlled process loop (36).

44. A method of determining an ultimate period and an ultimate gain of a process having a process input for receiving a control signal and a process output for providing a process output signal, wherein the process is controlled by a controller having a controller output for providing the control signal and coupled to the process input, and a controller input that receives a feedback signal derived from the process output, thereby forming a control loop, the method comprising:

measuring a process gain and a process phase lag of a first signal observed at first point in the control loop with respect to a second signal observed at a second point in the control loop at at least one observation frequency;

determining the ultimate gain and the ultimate period based on the at least one observation frequency, at least one process gain, and at least one process phase lag; and determining parameters of the controller based on the determined ultimate gain and ultimate period.

45. The method of claim 44 wherein a process gain and process phase lag is measured for at least two pairs of first and second signals, the first and second signals of one pair having a phase lag less than 180°0 and the first and second signals of the other pair having a phase lag greater than 180°.

46. A process control system for automatically tuning a controlled process loop (36) that includes a process (38) having a process input for receiving a process input signal and a process output for providing a process output signal, the process control system comprising:

a PID controller (40) having a controller output for producing a control signal u(t) coupled to the process input and a controller input which receives a controller error signal e(t) derived from the process output signal y(t), wherein the controlled process loop (36) is tuned by adjusting a proportional gain parameter $K_C$, an integration time parameter $T_I$, and a derivative time parameter $T_D$ of the PID controller (40);

a tuning sequence control module (46) coupled to the PID controller (40), for selecting at least one observation frequency, initiating and controlling a tuning sequence and adjusting the proportional gain parameter $K_C$, the integration time parameter $T_I$, and the derivative time parameter $T_D$ of the PID controller (40) based on a determined ultimate gain and a determined ultimate period;

a process gain and phase lag calculation module (42) coupled to the tuning sequence control module (46), the control signal u(t), and the process output signal y(t), for bandpass filtering from the control signal u(t) at each observation frequency a control sample signal, bandpass filtering from the process output signal y(t) at each observation frequency a process output sample signal, wherein control sample signals and process output sample signals filtered at a common observation frequencies form corresponding pairs, determining for each corresponding pair a phase lag of the process output sample signal of the corresponding pair with respect to the control sample signal of the corresponding pair, and determining for each corresponding pair a signal gain of the process output sample signal of the corresponding pair with respect to the control sample signal of the corresponding pair; and an ultimate gain and ultimate period calculation (44) module coupled to the process gain and phase lag calculation module (42) and the tuning sequence control module (46), for determining the ultimate period based on at least one observation frequency and at least one phase lag and determining the ultimate gain based on at least one signal gain.

47. An apparatus for determining an ultimate period and an ultimate gain of a process having a process input for receiving a control signal and a process output for providing a process output signal, wherein the process is controlled by a controller having a controller output for providing the control signal and coupled to the process input, and a controller input that receives a feedback signal derived from the process output, thereby forming a control loop, the apparatus comprising:

means for measuring a process gain and a process phase lag of a first signal observed at a first point in the control loop with respect to a second signal observed at a second point in the control loop at at least one observation frequency;

means for determining the ultimate gain and the ultimate period based on the at least one observation frequency, at least one process gain, and at least one process phase lag; and means for determining parameters of the controller based on the determined ultimate gain and ultimate period.

48. The apparatus of claim 47 wherein the means for measuring a process gain and process phase lag measures at least two pairs of first and second signals, the first and second signals of one pair having a phase lag less than 180° and the first and second signals of the other pair having a phase lag greater than 180°.

49. A method of determining an ultimate period and an ultimate gain of a controlled process having an input for receiving an input signal to control a parameter of the controlled process and an output for providing an output signal representative of the parameter of the controlled process, the method comprising:

isolating from the input signal a first input sample signal corresponding to a first observation frequency by bandpass filtering the input signal at the first observation frequency:

isolating from the output signal a first output sample signal corresponding to the first observation frequency by bandpass filtering the output signal at the first observation frequency determining a first phase lag of the first output sample signal with respect to the first input sample signal;

determining a first signal gain of the first output sample signal with respect to the first input sample signal;

determining the ultimate period based on the first observation frequency and the first phase lag;

determining the ultimate gain based on the first signal gain; and modifying the input signal to the controlled process based on the ultimate period and ultimate gain and thereby modifying the control of the parameter of the controlled process.

50. The method of claim 49 and further comprising:

isolating from the input signal a second input sample signal corresponding to a second observation frequency by bandpass filtering the input signal at the second observation frequency;

isolating from the output signal a second output sample signal corresponding to the second observation frequency by bandpass filtering the output signal at the second observation frequency;

determining a second phase lag of the second output sample signal with respect to the second input sample signal; and determining a second signal gain of the second output sample signal with respect to the second input sample signal.

51. The method of claim 50 wherein determining the ultimate period based on the first observation frequency and the first phase lag comprises:

determining the ultimate period by interpolation based on the first and second phase lags and the first and second observation frequencies.

52. The method of claim 51 wherein determining the ultimate period based on the first observation frequency and the first phase lag comprises:

setting the ultimate period approximately equal to $2\pi$ divided by the first observation frequency if the first phase lag does not differ from 180° by more than a predetermined quantity;

determining the ultimate period by dividing $2\pi$ by a sum of the first observation frequency and a frequency increment if the first phase lag is less than 180° by more than the predetermined quantity; and determining the ultimate period by dividing $2\pi$ by a difference of the first observation frequency minus the frequency increment if the first phase lag is more than 180° by more than the predetermined quantity.

53. The method of claim 52 wherein determining the ultimate period by dividing $2\pi$ by a sum and determining the ultimate period by dividing $2\pi$ by a difference each further comprise:

setting the first observation frequency to $2\pi$ divided by the ultimate period; and repeating determining the ultimate period based on the first observation frequency and the first one phase lag.

54. A system for automatically tuning parameters of a controller used to control a process in a process control loop, the system comprising:

a tuning sequence module coupled to the controller to select at least one observation frequency at which a phase lag and a gain of the process will be observed, and to determine process control parameters;

an ultimate gain and ultimate period calculation module coupled to the tuning sequence control module, for determining the ultimate period based on at least one observation frequency and at least one phase lag, and for determining the ultimate gain based on at least one gain;

a gain and phase lag calculation module coupled to the process, the tuning sequence control module, and the ultimate gain and ultimate period calculation module, for sampling an input signal and an output signal of the process corresponding to each observation frequency to form a corresponding pair, and for determining a phase lag and a gain of the corresponding pair; and means modifying the parameters of the controller based on the determined ultimate gain and ultimate period.

55. The system of claim 54 wherein the gain and phase lag calculation module forms at least two pairs of input and output signals such that the input and output signals of one pair have a phase lag less than 180° and the input and output signals of the other pair have a phase lag greater than 180°.

56. A method of determining an ultimate period and an ultimate gain of a process having a process input for receiving a control signal and a process output for providing a process output signal, wherein the process is controlled by a controller having a controller output for providing the control signal and coupled to the process input, and a controller input that receives a feedback signal derived from the process output, thereby forming a control loop, the method comprising:

measuring a gain and a phase of a first signal observed at a first point in the control loop at an observation frequency;

measuring a gain and a phase of a second signal observed at a second point in the control loop at the observation frequency;

determining a process gain and a process phase lag based on the measured gain and phase of the first and second signals;

determining the ultimate gain and the ultimate period based on the observation frequency, the process gain, and the process phase lag; and determining parameters of the controller bleed on the determined ultimate gain and ultimate period.

57. The method of claim 56 wherein a gain and phase lag is measured for at least two pairs of first and second signals, the first and second signals of one pair having a phase lag less than 180° and the first and second signals of the other pair having a phase lag greater than 180°.

58. An apparatus for determining an ultimate period and an ultimate gain of a process having a process input for receiving a control signal and a process output for providing a process output signal, wherein the process is controlled by a controller having a controller output for providing the control signal and coupled to the process input, and a controller input that receives a feedback signal derived from the process output, thereby forming a control loop, the apparatus comprising:

means for measuring a gain and a phase of a first signal observed at a first point in the control loop at an observation frequency;

means for measuring a gain and a phase of a second signal observed at a second point in the control loop at the observation frequency;

means for determining a process gain and a process phase lag based on the measured gain and phase of the first and second signals;

means for determining the ultimate gain and the ultimate period based on the observation frequency, the process gain, and the process phase lag; and means for determining parameters of the controller based on the determined ultimate gain and ultimate period.

59. The apparatus of claim 58 wherein the means for measuring a gain and phase lag measures at least two pain of first and second signals, the first and second signals of one pair having a phase lag less than 180° and the first and second signals of the other pair having a phase lag greater than 180°.

* * * * *

UNITED STATES PATENT AND TRADEMARK OFFICE
CERTIFICATE OF CORRECTION

PATENT NO. : 5,587, 899
DATED : December 24, 1996
INVENTOR(S) : Weng K. Ho, et. al.

It is certified that error appears in the above-indentified patent and that said Letters Patent is hereby corrected as shown below:

Col. 1, line 46, delete "$T_D 0.125 T_U$, insert --$T_D = 0.125 T_u$.--

Col. 9, line 31, delete "$<G(i\omega)$" insert --$\angle G(i\omega)$--

Col. 9, line 33, delete "$<G_2(i\omega)$", insert --$\angle G_2(i\omega)$--and at lines 35 and 38, delete "$<G_3(i\omega)$", insert --$\angle G_3(i\omega)$--

Col. 10, line 50, delete "$P_k = A_k, <\phi_k$, insert --$P_k = A_k, \angle \phi_k$,--

Col. 11, line 12, delete "$\omega_1 < \omega_2 ... \omega_N$,", insert --$\omega_1 < \omega_2 < ... < \omega_N$.--

Col. 23, line 23, delete "180°O", insert --180°--

Signed and Sealed this

Eighth Day of April, 1997

BRUCE LEHMAN

*Attest:*

*Attesting Officer*     Commissioner of Patents and Trademarks